US012620306B1

(12) United States Patent
Mulligan

(10) Patent No.: US 12,620,306 B1
(45) **Date of Patent: *May 5, 2026**

(54) SYSTEMS, METHODS, DEVICES, AND APPARATUSES FOR INTELLIGENT TRAFFIC SIGNALING

(71) Applicant: Applied Information, Inc., Suwanee, GA (US)

(72) Inventor: Bryan Mulligan, Suwanee, GA (US)

(73) Assignee: Applied Information, Inc., Suwanee, GA (US)

( * ) Notice: Subject to any disclaimer, the term of this patent is extended or adjusted under 35 U.S.C. 154(b) by 162 days.

This patent is subject to a terminal disclaimer.

(21) Appl. No.: 18/430,920

(22) Filed: Feb. 2, 2024

Related U.S. Application Data

(63) Continuation of application No. 17/521,433, filed on Nov. 8, 2021, now abandoned, which is a (Continued)

(51) Int. Cl.
*G08G 1/08* (2006.01)
*G08G 1/01* (2006.01)

(52) U.S. Cl.
CPC ............. *G08G 1/08* (2013.01); *G08G 1/0112* (2013.01); *G08G 1/0145* (2013.01)

(58) Field of Classification Search
CPC ...... G08G 1/08; G08G 1/0112; G08G 1/0145; G08G 1/075; G08G 1/096716; G08G 1/00;

(Continued)

(56) References Cited

U.S. PATENT DOCUMENTS 4,101,191 A 7/1978 Gould et al.
5,153,525 A 10/1992 Hoekman et al.

(Continued)

FOREIGN PATENT DOCUMENTS

CN 202049621 U 11/2011
CN 107967818 A 4/2018

(Continued)

OTHER PUBLICATIONS

Chavan S.S., et al., "Design of Intelligent Traffic Light Controller Using Embedded System," Second International Conference on Emerging Trends in Engineering and Technology, ICETET—09, 2009, pp. 1086-1091, Dec. 16, 2009.

(Continued)

*Primary Examiner* — Brian A Zimmerman
*Assistant Examiner* — Anthony D Afrifa-Kyei
(74) *Attorney, Agent, or Firm* — Bradley Arant Boult Cummings LLP; Daniel E. Sineway, Esq.

(57) ABSTRACT

Systems, methods, devices, and apparatuses for intelligent traffic signaling are disclosed. The system can include sensors for detecting approaching automobiles. The system can include a processor operable to receive data directly from nearby automobiles and detected data from the sensors. The processor can determine, based on the detected or received data, a level of safeness associated with crossing the opposing traffic lane. The level of safeness can be calculated by at least determining an expected time to arrival of an approaching automobile at the traffic intersection. The system can control one or more traffic beacons based on the level of safeness.

20 Claims, 3 Drawing Sheets

Related U.S. Application Data continuation of application No. 16/591,267, filed on Oct. 2, 2019, now Pat. No. 11,205,345.

(60) Provisional application No. 62/739,978, filed on Oct. 2, 2018.

(58) Field of Classification Search
CPC ...... G08G 1/09; G08G 1/0962; G08G 1/0967; G08G 1/096708; G08G 1/0133; G08G 1/0141; G08G 1/096741; G08G 1/096775; G08G 1/096791; G08B 29/123
See application file for complete search history.

(56) References Cited

U.S. PATENT DOCUMENTS

| | | | |
|---|---|---|---|
| 5,172,113 | A | 12/1992 | Hamer |
| 5,187,373 | A | 2/1993 | Gregori |
| 5,187,476 | A | 2/1993 | Hamer |
| 5,202,683 | A | 4/1993 | Hamer et al. |
| 5,278,555 | A | 1/1994 | Hoekman |
| 5,281,965 | A | 1/1994 | Hoekman et al. |
| 5,508,698 | A | 4/1996 | Hoekman |
| 5,523,753 | A | 6/1996 | Fedde et al. |
| 5,539,398 | A | 7/1996 | Hall et al. |
| 5,602,739 | A | 2/1997 | Haagenstad et al. |
| 5,621,645 | A | 4/1997 | Brady |
| 5,734,338 | A | 3/1998 | Hoekman et al. |
| 5,745,865 | A | 4/1998 | Rostoker et al. |
| 5,751,225 | A | 5/1998 | Fedde et al. |
| 5,850,192 | A | 12/1998 | Turk et al. |
| 5,926,113 | A | 7/1999 | Jones et al. |
| 5,955,968 | A | 9/1999 | Bentrott et al. |
| 5,986,575 | A | 11/1999 | Jones et al. |
| 6,133,854 | A | 10/2000 | Yee et al. |
| 6,243,026 | B1 | 6/2001 | Jones et al. |
| 6,326,903 | B1 | 12/2001 | Gross et al. |
| 6,621,420 | B1 | 9/2003 | Poursartip |
| 6,870,489 | B2 | 3/2005 | Cybulski |
| 6,940,422 | B1 | 9/2005 | Bachelder et al. |
| 6,958,707 | B1 | 10/2005 | Siegel |
| 6,989,766 | B2 | 1/2006 | Mese et al. |
| 7,307,547 | B2 | 12/2007 | Schwartz |
| 7,317,406 | B2 * | 1/2008 | Wolterman .............. G08G 1/08 340/905 |
| 7,327,280 | B2 | 2/2008 | Bachelder et al. |
| 7,333,028 | B2 | 2/2008 | Schwartz |
| 7,417,560 | B2 | 8/2008 | Schwartz |
| 7,432,826 | B2 | 10/2008 | Schwartz |
| 7,515,064 | B2 | 4/2009 | Schwartz |
| 7,573,399 | B2 | 8/2009 | Schwartz |
| 7,642,928 | B2 | 1/2010 | Hutchison |
| 7,647,180 | B2 | 1/2010 | Breed |
| 7,663,505 | B2 | 2/2010 | Publicover |
| 7,808,401 | B1 | 10/2010 | Schwartz et al. |
| 7,868,783 | B2 | 1/2011 | Bachelder |
| 7,952,491 | B2 | 5/2011 | Schwartz et al. |
| 7,982,631 | B2 | 7/2011 | Schwartz et al. |
| 8,031,062 | B2 | 10/2011 | Smith |
| 8,072,346 | B2 | 12/2011 | Hall et al. |
| 8,319,662 | B1 | 11/2012 | Bontemps et al. |
| 8,325,062 | B2 | 12/2012 | Johnson |
| 8,344,908 | B2 | 1/2013 | Johnson |
| 8,373,578 | B1 | 2/2013 | Sikora et al. |
| 8,487,780 | B2 | 7/2013 | Edwardson |
| 8,610,596 | B2 | 12/2013 | Johnson |
| 8,618,954 | B2 | 12/2013 | Free |
| 8,773,282 | B2 | 7/2014 | Cross |
| 8,783,626 | B2 | 7/2014 | Cross |
| 8,823,548 | B2 | 9/2014 | Johnson et al. |
| 8,830,085 | B2 | 9/2014 | Edwardson et al. |
| 8,878,695 | B2 | 11/2014 | Cross |
| 8,884,783 | B2 | 11/2014 | Roberts et al. |
| 8,912,922 | B2 | 12/2014 | Eichhorst |
| 8,972,145 | B2 | 3/2015 | Mahler et al. |
| 9,208,684 | B2 | 12/2015 | Lee et al. |
| 9,299,253 | B2 | 3/2016 | Eichhorst |
| 9,302,687 | B2 | 4/2016 | Cross |
| 9,330,566 | B2 | 5/2016 | Cross |
| 9,361,798 | B2 | 6/2016 | Neuman |
| 9,460,620 | B2 | 10/2016 | Evans |
| 9,478,131 | B2 | 10/2016 | Eichhorst |
| 9,536,427 | B2 | 1/2017 | Tonguz et al. |
| 9,542,852 | B2 | 1/2017 | Cross et al. |
| 9,564,049 | B2 | 2/2017 | Diba |
| 9,751,543 | B2 | 9/2017 | Cross |
| 9,773,411 | B2 | 9/2017 | Popple |
| 9,799,221 | B2 | 10/2017 | Baller |
| 9,911,334 | B2 | 3/2018 | Townsend |
| 9,916,759 | B2 | 3/2018 | Cross |
| 9,922,559 | B1 | 3/2018 | Inoue |
| 9,928,738 | B2 | 3/2018 | Bauer et al. |
| 9,947,219 | B2 | 4/2018 | Rolle et al. |
| 9,953,522 | B2 | 4/2018 | Cross et al. |
| 9,965,951 | B1 | 5/2018 | Gallagher et al. |
| 9,978,270 | B2 | 5/2018 | Raamot |
| 9,990,548 | B2 | 6/2018 | Wellington et al. |
| 10,019,898 | B2 | 7/2018 | Miller |
| 10,029,716 | B2 | 7/2018 | Cross et al. |
| 10,121,370 | B2 | 11/2018 | Elsheemy |
| 10,127,811 | B2 | 11/2018 | Xu et al. |
| 10,198,947 | B2 | 2/2019 | Meyer et al. |
| 10,217,356 | B2 | 2/2019 | Baller |
| 10,311,725 | B2 | 6/2019 | Cross et al. |
| 11,030,895 | B1 | 6/2021 | Kulus et al. |
| 11,158,189 | B2 | 10/2021 | Edwardson et al. |
| 11,200,802 | B1 | 12/2021 | Edwardson |
| 11,232,707 | B1 | 1/2022 | Kulus et al. |
| 2002/0027510 | A1 | 3/2002 | Jones et al. |
| 2005/0104745 | A1 | 5/2005 | Bachelder et al. |
| 2005/0187701 | A1 | 8/2005 | Baney |
| 2007/0001871 | A1 | 1/2007 | Pfleging et al. |
| 2011/0133952 | A1 | 6/2011 | McNamara et al. |
| 2014/0247159 | A1 * | 9/2014 | Cross ..................... G08G 1/082 340/906 |
| 2015/0154860 | A1 | 6/2015 | Holzwanger et al. |
| 2016/0063859 | A1 | 3/2016 | Leung |
| 2016/0148267 | A1 | 5/2016 | Pittman et al. |
| 2017/0061791 | A1 | 3/2017 | Cherewka |
| 2017/0124868 | A1 | 5/2017 | Bhat et al. |
| 2017/0206783 | A1 * | 7/2017 | Miller .................. G08G 1/0116 |
| 2017/0301237 | A1 | 10/2017 | Macneille et al. |
| 2017/0372602 | A1 | 12/2017 | Gilliland et al. |
| 2018/0047286 | A1 | 2/2018 | Gage et al. |
| 2018/0075739 | A1 | 3/2018 | Ginsberg et al. |
| 2018/0090009 | A1 | 3/2018 | Roessler et al. |
| 2018/0096595 | A1 | 4/2018 | Janzen et al. |
| 2018/0144203 | A1 | 5/2018 | Moosaei et al. |
| 2018/0151064 | A1 | 5/2018 | Xu et al. |
| 2018/0190111 | A1 | 7/2018 | Green et al. |
| 2018/0261083 | A1 | 9/2018 | Sun |
| 2018/0268692 | A1 | 9/2018 | Takada et al. |
| 2019/0082377 | A1 | 3/2019 | Silver |
| 2019/0122548 | A1 | 4/2019 | Sakuma et al. |
| 2019/0172346 | A1 | 6/2019 | Barker |
| 2019/0180617 | A1 | 6/2019 | Hori et al. |
| 2020/0168081 | A1 | 5/2020 | Ran et al. |
| 2020/0184238 | A1 | 6/2020 | Kobayashi et al. |
| 2020/0242922 | A1 | 7/2020 | Dulberg et al. |
| 2022/0003562 | A1 | 1/2022 | Mack et al. |

FOREIGN PATENT DOCUMENTS

| | | | |
|---|---|---|---|
| CN | 110262355 | B | 3/2022 |
| DE | 102014204059 | A1 | 9/2015 |
| EP | 2490197 | A1 | 8/2012 |
| IN | 222014 | | 5/2014 |
| JP | 2010146334 | A | 7/2010 |
| JP | 2011195122 | A | 10/2011 |
| WO | 2017215365 | A1 | 12/2017 |

(56) References Cited

OTHER PUBLICATIONS

Final Office Action for U.S. Appl. No. 17/521,433, mailed May 22, 2024, 18 Pages.
Goel S., et al., "Self-Organization in Traffic Lights; Evolution of Signal Control With Advances in Sensors and Communications," Jun. 18, 2017, 54 Pages.
ITERIS: "TransitHelper," 2018, 4 Pages, Retrieved from URL: https://www.iteris.com/products/communications/transithelper.
Jagadeesh Y.M., et al., "Smart Autonomous Traffic Light Switching by Traffic Density Measurement Through Sensors," International Conference on Computers, Communications and Systems, Jan. 1, 2015, pp. 123-126.
Mlinaric M., "Intelligent Traffic Control With Priority for Emergency Vehicles," Masters Thesis, Dec. 31, 2016, 76 Pages.
Non-Final Office Action for U.S. Appl. No. 17/521,433, mailed Nov. 24, 2023, 14 Pages.
Talas M., "Connected Vehicle Challenges for the Dense Urban Environment," Institute of Transportation Engineers, ITE Journal, Dec. 2018, vol. 88, No. 12, pp. 30-35, 8 Pages.
Younis O., et al., "Employing Cyber-Physical Systems: Dynamic Traffic Light Control at Road Intersections," IEEE Internet of Things Journal, Dec. 2017, vol. 4, No. 6, pp. 2286-2296.

* cited by examiner

SYSTEMS, METHODS, DEVICES, AND APPARATUSES FOR INTELLIGENT TRAFFIC SIGNALING

CROSS REFERENCE TO RELATED APPLICATIONS

This application is a continuation patent application of, and claims the benefit of and priority to, U.S. Non-Provisional patent application Ser. No. 17/521,433, filed on Nov. 8, 2021, and entitled "SYSTEMS, METHODS, DEVICES, AND APPARATUSES FOR INTELLIGENT TRAFFIC SIGNALING," which is a continuation patent application of, and claims the benefit of and priority to, U.S. Non-Provisional patent application Ser. No. 16/591,267, filed on Oct. 2, 2019, and entitled "SYSTEMS, METHODS, DEVICES, AND APPARATUSES FOR INTELLIGENT TRAFFIC SIGNALING," which claims the benefit of, and priority to, U.S. Provisional Patent Application No. 62/739,978, filed on Oct. 2, 2018, and entitled "SYSTEMS, METHODS, DEVICES, AND APPARATUSES FOR INTELLIGENT TRAFFIC SIGNALING," the disclosures of which are incorporated by reference as if the same were set forth herein in their entireties.

TECHNICAL FIELD

The present disclosure relates generally to intelligent traffic signaling using a plurality of sensors and networked electronic computing devices.

BACKGROUND

The technology included in conventional traffic controllers and lighting systems has largely remained unchanged for the past century. Generally, traffic controller boxes regulate one or more lights at intersections, crosswalks, beacons, etc., based on hard-coded and static states for dictating the right-of-way for drivers and pedestrians. Despite the seemingly acceptable functionality of preexisting traffic systems, modern technology is rapidly outpacing the status quo. Therefore, there exists a long-felt but unresolved need for systems, methods, and apparatuses that improve traffic signals by connecting mobile phones, automobiles, or other communication hardware available to drivers and pedestrians alike to the systems that regulate traffic for improving the safety and overall experience of citizens on the road.

BRIEF SUMMARY OF DISCLOSURE

The present systems, methods, devices, and apparatuses relate generally to the management of traffic controllers and traffic lights/signals based on cellular data, radar, and/or radio frequency ("RF") data relating to the real-time positions of one or more automobiles and/or pedestrians. In one embodiment, the system, methods, devices, and apparatuses discussed in the present disclosure aim to improve outdated and conventional traffic controllers by integrating hardware and software solutions that allow for traffic related data to be shared between the traffic controllers, drivers, and pedestrians to promote a safer, more efficient, and overall enhanced traffic environment.

In various embodiments, the systems, methods, devices, and apparatuses described herein may allow for a driver of a vehicle (or a pedestrian) to be informed of the safeness of an opposing roadway for crossing the opposing roadway. As will be discussed in greater detail herein, aspects of the present disclosure determine a traffic light state based on one or more sensor readings. The sensor readings may be received from sensors such as radar sensors, RF sensors, and LTE-supported or other wireless networked devices, and these sensor readings may indicate the location, heading, speed, and/or other information relating to their respective vehicles.

In particular embodiments, the traffic light states may be displayed independently from preexisting traffic lights (e.g., red, yellow, and green lights directing regular traffic flow). For example, separate devices may be installed near turning lanes (e.g., when turning across traffic where no intersection is present) to include a plurality of lights, where the plurality of lights may include various turning arrow configurations of different blinking patterns and colors. As will be described in greater detail herein, sensor readings may be processed and compared to predefined thresholds (or the like) for determining which traffic light state the system should display. In certain embodiments, some lighting configurations may indicate that the opposing lane is safe to cross, while others may indicate that the opposing lane is dangerous to cross. Aspects of the present disclosure provide improvements over traditional traffic lights and controllers such that embodiments of the present disclosure indicate the safeness of an opposing lane, while traditional traffic systems do not.

In one embodiment, the present disclosure discusses a system for traffic management, including: a plurality of electronic computing devices at a plurality of automobiles, wherein each of the plurality of electronic computing devices includes one or more transmitters that propagate signals including location, speed, and heading data of the automobile; and a traffic management device located at a traffic crossing, wherein the traffic management device is positioned to monitor a respective opposing traffic lane, and wherein the traffic management device includes: traffic data detection sensors, wherein the traffic data detection sensors include radio frequency ("RF"), Wi-Fi, cellular, and radar sensors configured to detect traffic data including a distance and speed of automobiles approaching in an opposing traffic lane; one or more traffic beacons including turning arrows; and a processor operatively connected to the traffic data detection sensors for controlling the one or more traffic beacon states, and wherein the processor is configured to: receive the location, speed, and heading data from the plurality of electronic computing devices corresponding to approaching automobiles; receive distance and speed data corresponding to approaching automobiles from the traffic data detection sensors; compare the first-received of the location, speed, and heading data, or the detected distance and speed traffic data, to a predetermined speed threshold for determining an expected time to arrival at the traffic crossing for the approaching automobiles; determine a level of safeness for crossing the opposing traffic lane based on the expected time to arrival at the traffic crossing for the approaching automobiles; and indicating the level of safeness via the turning arrows to drivers and/or pedestrians intending to cross the opposing traffic lane.

In various embodiments, the plurality of electronic computing devices include mobile phones and/or on-board computing devices at the plurality of automobiles. In certain embodiments, the traffic data detection sensors are configured to monitor about a thirty degree field of view, originating from the traffic management device, over a range of about 750-900 feet. In a particular embodiments, the processor is further configured to compare the received location, speed, and heading data to the detected traffic data to confirm approaching automobiles.

In one embodiment, he traffic management device transmits received location, speed, and heading data, detected traffic data, and calculated expected times to arrival to neighboring traffic management devices. In certain embodiments, the system operates in near real-time. In at least one embodiment, a turning arrow flashing yellow indicates that the opposing traffic lane is safe to cross. Further, in particular embodiments, a red arrow indicates that the opposing traffic lane is unsafe to cross. In various embodiments, after a predetermined time threshold elapses without receiving new detected traffic data indicating the presence of an approaching automobile, the processor is further configured to change the red arrow to a flashing yellow arrow. Generally, the predetermined time threshold is about ten seconds. In certain embodiments, the one or more traffic beacons exclude green turning arrows.

The present disclosure further discusses a standalone traffic management system including: a pole configured in a vertically-upright position, wherein the pole is secured in the vertically-upright position via a base; one or more traffic data detection sensors coupled to the pole, wherein the one or more traffic data detection sensors include radio frequency sensors and radar sensors, and wherein the one or more traffic data detection sensors are positioned to monitor an opposing roadway; one or more traffic state indicators coupled to the pole, wherein the one or more traffic state indicators include arrows operable to be illuminated with various colors and flashing patterns for indicating traffic states relating to detected automobiles in the opposing roadway; a cabinet coupled to the pole for housing electronic equipment, the electronic equipment including signal transmitters and receivers, and a processor for determining the traffic states based on at least traffic data including speed and distance corresponding to the detected automobiles in the opposing roadway; and a solar panel positioned at the top of the pole for supplying power to the standalone traffic management system. In various embodiments, the processor is operable to receive speed, location, and heading data transmitted from nearby automobiles. In certain embodiments, the standalone traffic management system is in operable communication with neighboring traffic management systems for transmitting received location, speed, and heading data, and detected traffic data, to the neighboring traffic management systems. In particular embodiments, the standalone traffic management system operates in near real-time.

In at least one embodiment, an arrow flashing yellow indicates that the opposing traffic roadway is safe to cross. In certain embodiments, a red arrow indicates that the opposing traffic roadway is unsafe to cross. In various embodiments, after a predetermined time threshold elapses without receiving new detected traffic data indicating the presence of an approaching automobile, the processor is further configured to change the red arrow to a flashing yellow arrow. In one embodiment, the predetermined time threshold is about ten seconds. In particular embodiments, the one or more traffic state indicators exclude green arrows.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF DRAWINGS

Figure 1:
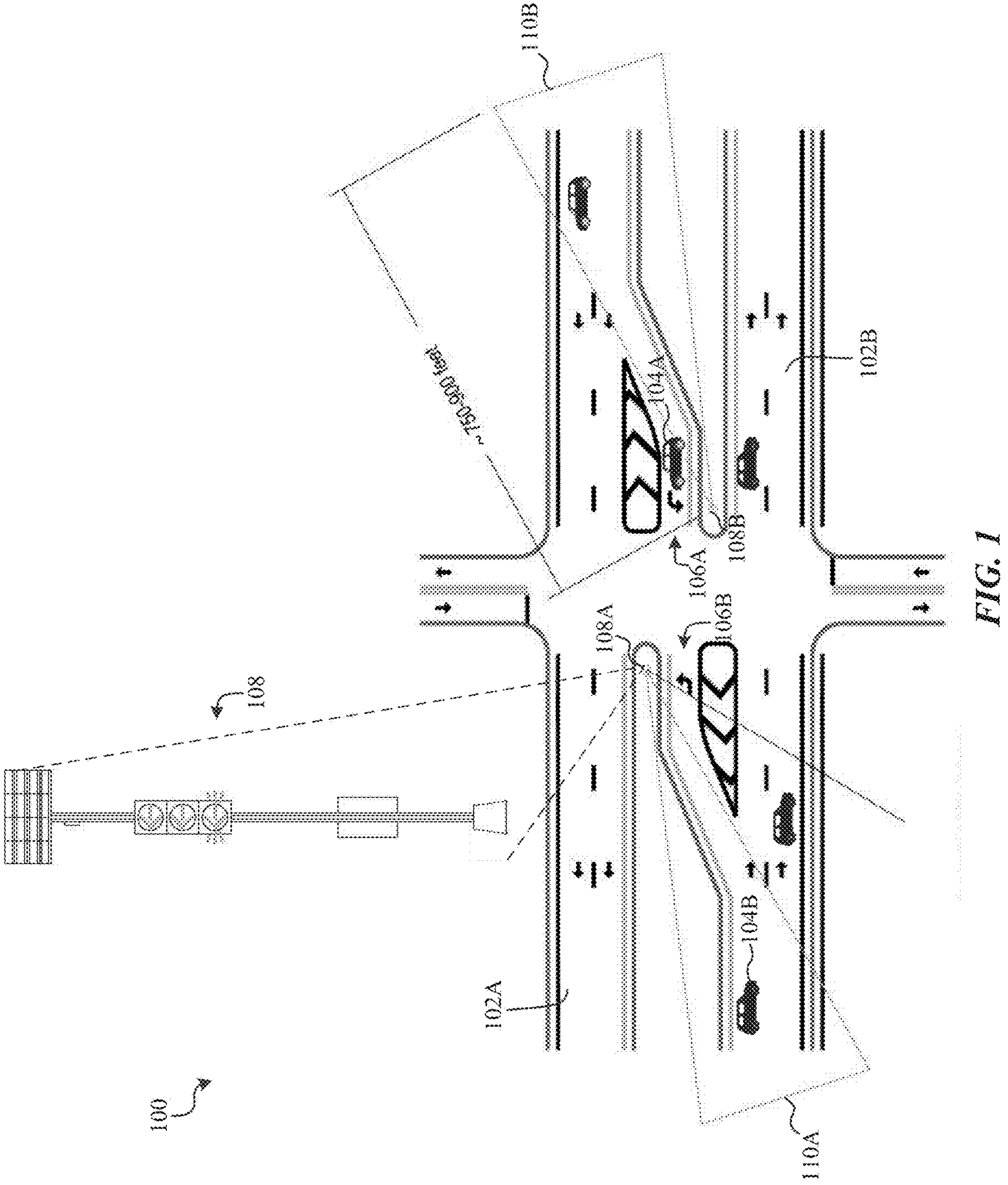
FIG. 1 is an exemplary system environment, according to one aspect of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure relate generally to the management of traffic controllers and traffic lights/signal based on cellular and/or radio frequency data transmitted to and received from mobile devices, automobiles, or other communication hardware available to drivers and pedestrians. In one embodiment, the system, methods, and devices discussed in the present disclosure aim to improve outdated and conventional traffic controllers by integrating hardware and software solutions that allow for traffic related data to be shared between the traffic controllers, drivers, and pedestrians to promote a safer, more efficient, and overall enhanced traffic environment.

In various embodiments, the systems, methods, devices, and apparatuses described herein may allow for a driver of a vehicle (or a pedestrian) to be informed of the safeness of an opposing roadway for crossing the opposing roadway. As will be discussed in greater detail herein, aspects of the present disclosure determine a traffic light state based on one or more sensor readings. The sensor readings may be received from sensors such as radar sensors, RF sensors, and LTE-supported or other wireless networked devices, and these sensor readings may indicate the location, heading, speed, and/or other information relating to their respective vehicles.

In particular embodiments, the traffic light states may be displayed independently from preexisting traffic lights (e.g., red, yellow, and green lights directing regular traffic flow). For example, separate devices may be installed near turning lanes (e.g., when turning across oncoming traffic where no intersection is present) to include a plurality of lights, where the plurality of lights may include various turning arrow configurations of different blinking patterns and colors. As will be described in greater detail herein, sensor readings may be processed and compared to predefined thresholds (or the like) for determining which traffic light state the system should display. In certain embodiments, some lighting configurations may indicate that the opposing lane is safe to cross, while others may indicate that the opposing lane is dangerous to cross. Aspects of the present disclosure provide improvements over traditional traffic lights and controllers such that embodiments of the present disclosure indicate the safeness of an opposing lane, while traditional traffic systems do not.

Referring now to the drawings, FIG. 1 illustrates an exemplary system environment 100, according to one aspect of the present disclosure. In various embodiments, the system 100 may include at least two opposing roadways, depicted herein as 102A and 102B. Generally, these at least two opposing roadways may share the same road (the lanes are not separated by a median or the like) or the roadways may be separated by a dividing structure (e.g., a median, a barrier, agriculture, etc.). As shown in the present embodiment, the roadways 102A and 102B include vehicles 104A and 104B, respectively, where the vehicles 104A and 104B are travelling in opposing directions. In particular embodiments, the roadways 102A and 102B may include one or more turning lanes or intersections, such as the turning lanes 106A and 106B. Consider, for example, a scenario where the vehicle 104A and/or vehicle 104B were required to execute a turn across their respective opposing roadways. In this example, and referring particularly to the car 104A, the driver of the vehicle 104A may not be able to determine if a safe turn may be executed across the roadway 102B (e.g., due to visual obstructions, poor depth perception, road curvature, low light conditions, etc.). As such, and according to various aspects of the present disclosure, the system 100 may include one or more devices 108, depicted in the present embodiment as devices 108A and 108B, where the devices 108A and 108B may be installed near the intersections or turning lanes 106A and 106B, respectively, for detecting the status of the opposing traffic and furthermore indicating the status of the oncoming traffic to the drivers of the vehicles 104A and 104B. Continuing with the example discussed above, the driver of the vehicle 104A may read the lighting patterns on the device 108A for determining if the opposing roadway 102B is safe to cross. It should be understood that turning across opposing traffic is generally done at the driver's own risk (e.g., the opposing driver(s) may have the right-of-way and are not required to stop). The devices 108 may include various lights of various colors (e.g., yellow and red, or other colors as appropriate) configured to illuminate in solid or blinking states. In certain embodiments, the various combinations of light colors and states may indicate certain traffic states and levels of safeness to cross to opposing roadway. Thus, aspects of the present disclosure allow for drivers to make the safest decisions when crossing opposing traffic based on the signaling of the lights on the traffic signaling devices 108.

In certain embodiments, the devices 108 may leverage various technologies for providing the traffic status indications. In various embodiments, the devices 108 may be equipped with (or operatively connect to) a radar system for detecting the distance and velocity of objects in a particular field of view. In certain embodiments, the devices 108 may also leverage data from a network of wireless communication devices such as mobile phones, radio frequency ("RF") transmitters and receivers, on-board vehicle computer systems, etc., each of which may be referred to herein as a "sensor." In certain embodiments, the use of one or more sensors allows for the system to be reliable, robust, accurate, and operate in real-time. Accordingly, in the event that the RF sensor is malfunctioning, the radar system may still allow for the system to properly function for providing real-time data readings for determining the safeness of various roadway scenarios. In particular embodiments, the devices 108 and operatively connected sensors may communicate as an interconnected network, such that a reading associated with a traffic state at one device 108 may be transmitted to surrounding devices (or other nearby traffic controllers), thereby informing the surrounding devices of approaching traffic or general traffic conditions. In certain embodiments, mobile devices belonging to drivers, or on-board vehicle computer systems, may continuously transmit data such as speed and direction to the devices 108. Accordingly, the sharing of data over a network between the devices 108 and vehicles, in combination with sensor readings such as radar or RF readings, allows for the devices to reliably determine the safeness of an opposing roadway in real-time.

In certain embodiments, the devices 108 and corresponding sensors may be installed at or near the intersections 106. In various embodiments, the devices 108 may be installed and configured such that the sensors may monitor a particular area, such as the areas 110A and 110B, or a field of view over a certain distance. For example, and depicted in the present embodiment, the device 108B may be configured to monitor (approximately) a thirty (30) degree view over a range of approximately 750-900 ft. Accordingly, these sensor configurations allow for the devices 108 to determine the safeness of the opposing roadways, intersection, and turning lanes (based on opposing traffic) prior to the drivers being able to see the traffic, and furthermore indicate the traffic status to the driver via the various lighting states.

Figure 2:
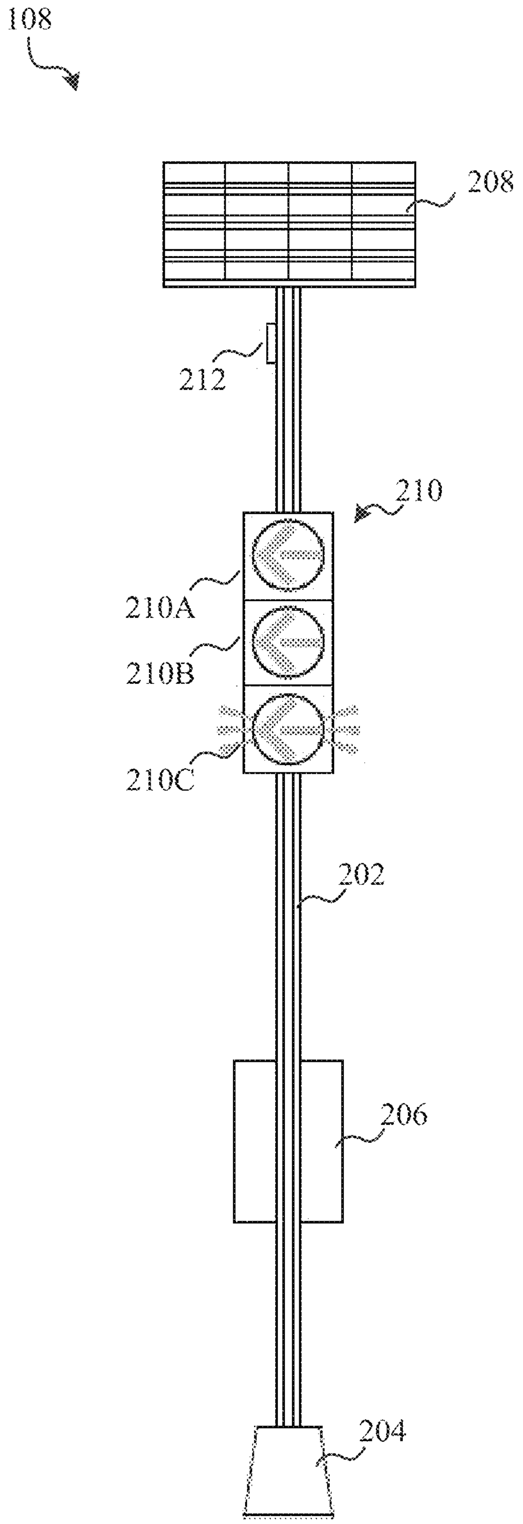
FIG. 2 is an exemplary traffic apparatus, according to one aspect of the present disclosure.

Turning now to FIG. 2, an exemplary device 108 is shown, according to one aspect of the present disclosure. In certain embodiments, the device 108 may be a standalone device or structure, or the device may be integrated into preexisting structures, such as a telephone pole or general traffic light system. As depicted in the present embodiment, the device 108 includes at least a pole 202 with a base 204, where a cabinet 206, solar panel 208, and a plurality of lights 210 are coupled to the pole 202. In particular embodiments, a radar sensor 212 (or various other sensor types) may also be coupled to the pole 202. According to various aspects of the present disclosure, the base 204 may be bolted or otherwise installed near a particular turning lane for securing the pole 202 within the base 204. In certain embodiments, the cabinet 206 may be coupled to the pole 202 towards the lower end of the pole 202 for allowing convenient access to the cabinet 206 in scenarios where repair or service is needed. Near the top end of the pole 202, in various embodiments, is the solar panel 208. In certain embodiments, the solar panel 208 may be a 100W solar panel with approximate dimensions of 25 inches by 40 inches for collecting sufficient sunlight to power the plurality of lights 210, as well as the electronics included in the cabinet 206 and the radar sensor 212. However, in particular embodiments, the device 108 may include alternative or additional power sources, as appropriate.

In one embodiment, the cabinet 206 may house a controller system for determining the states of the plurality of lights, controlling the radar sensor 212 (or other sensors), communicating with a plurality of additional sensors (such as cell phones, on-board vehicle communication systems, etc.), and other various traffic managing functions. For example, the device may include an LTE sensor or antenna (alternatively or in addition to the radar sensor 212), and the controller system may include supporting hardware for the LTE sensor such as transmitters and/or receivers. In some embodiments, the cabinet 206 may house electronic hardware (e.g., the controller system) including server racks or other computing boards that process sensor readings, store traffic related information such as intersection/turning lane geometry or light schedules/states, etc. In various embodiments, the cabinet 206 may be shared with other traffic controlling systems, such as those for standard intersection traffic lights, for controlling other traffic devices in addition to the device 108. In other embodiments, the exemplary device 108 may be entirely standalone. In these standalone embodiments, the device 108 components are self-contained, for example, the pole 202, the base 204, the cabinet 206, the power supply (e.g., solar panels 208), the lights 210, and the sensor(s) 212 are all dedicated to the device 108 and are not shared with other devices or traffic lights, and the device 108 does not rely on outside power sources or communication/computing networks.

As depicted in the present embodiment, the plurality of lights 210 includes three (3) arrow options, 210A, 210B, and 210C. According to various aspects of the present disclosure, the three arrow options each may indicate one or more traffic states, as will be discussed immediately below. In one embodiment, the arrow 210A may be a red arrow, where the red arrow is solid when illuminated. In various embodiments, a solid red arrow, indicated by the arrow 210A, indicates that the intersection is not safe to cross. In certain embodiments, a solid yellow arrow, indicated by the arrow 210B, may indicate that the intersection is unsafe to cross but may shortly become safe to cross. The arrow 210C may be for indicating a flashing yellow arrow, in particular embodiments, where the flashing yellow arrow 210C indicates that the opposing roadway is free of immediate danger and may be crossed with caution (however, the driver is to cross at his/her own risk). In one embodiment, the plurality of lights may include any light shape, color, blinking pattern, etc., for appropriately communicating to a driver that an opposing roadway is safe to cross. Further, in various embodiments, the plurality of lights 210 may be only a single light configurable to support each of the light states discussed immediately above. In other embodiments, the traffic states may be indicated in other ways, such as via audible sounds/alerts, display screens (e.g., LCD screens, or the like), lasers, messages directed to an automobile on-board computing system which may then be displayed/presented to the driver, etc.

In various embodiments, sensor readings from the radar sensor 212 (or other sensors) may allow the system to determine the level of safety or general safeness of the opposing roadway based on detected opposing traffic. In one embodiment, the radar sensor 212 may be configured to detect oncoming objects within ranges of approximately 750-900 feet, although in some configurations the radar 212 sensor (or other sensors) may be capable of monitoring greater ranges. According to various aspects of the present disclosure, an object traveling 60 miles per hour covers approximately 88 feet per second. Therefore, the system may be able to detect objects approximately 8-11 seconds prior to reaching the intersection. In certain embodiments, the system may calculate these distance and time ranges (e.g., a calculated time to reach the intersection or turning lane) for determining the safeness of the opposing roadway, and furthermore for determining which light state to display via the device 108 (thus allowing a driver to make an informed and safe decision when crossing the opposing roadway).

Figure 3:
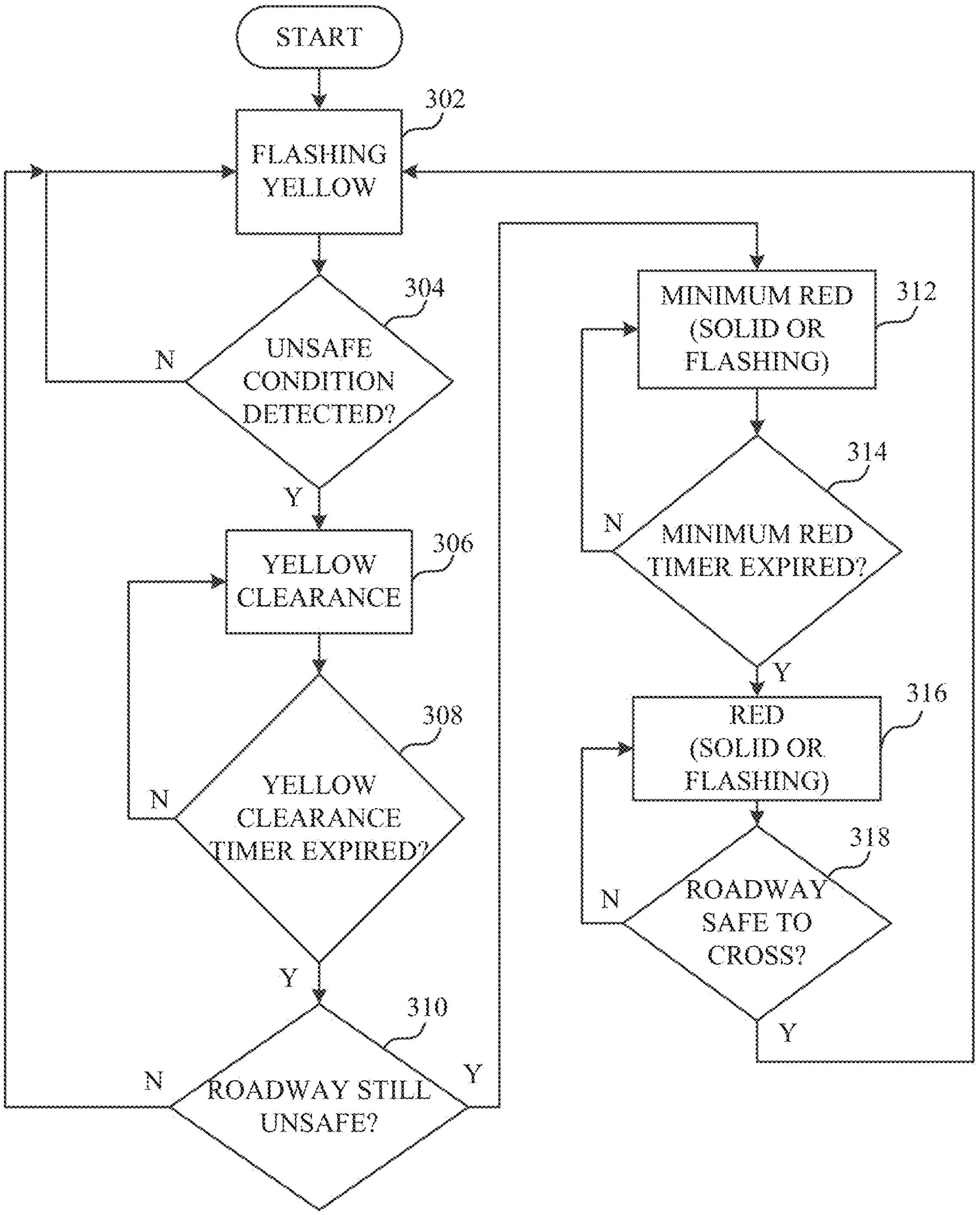
FIG. 3 is an exemplary system flowchart, according to one aspect of the present disclosure.

Turning now to FIG. 3, a flowchart of the device states and state transitions process 300 is shown, according to one aspect of the present disclosure. In one embodiment, the process 300 may begin at any step or device state; however, in the present embodiment, the process 300 begins at step 302 where the device is in a flashing yellow state. According to various aspects of the present disclosure, the flashing yellow state at step 302 may indicate to a driver that the opposing roadway is safe to cross. In certain embodiments, the system may determine to display the flashing yellow state at step 302 based on a calculated time range until opposing traffic poses immediate danger, a real-time radar distance, readings from other devices such as GPS signals from mobile phones or on-board vehicle computers, etc.

In a particular embodiment, at step 304, the system determines if an unsafe condition is detected in a particular monitored area (e.g., an intersection, a turning lane, etc.). In one embodiment, if an unsafe condition is not detected, the device may continue to maintain the flashing yellow arrow at step 302; however, if an unsafe condition is detected at step 304, the process 300 may proceed to step 306 where the light state changes from flashing yellow to yellow clearance. In various embodiments, a yellow clearance state at step 306 includes changing the flashing yellow arrow to a solid yellow arrow. According to various aspects of the present embodiment, a solid yellow arrow may indicate that detected objects are "clearing" through the intersection and a driver intending to cross the opposing roadway should wait until the intersection clears.

In one embodiment, the system may include a yellow clearance timer or the like for tracking how long certain states have been active. In a particular embodiment, at step 308, the system may determine if the yellow clearance timer has expired or reached a predetermined time threshold. If, at step 308, the system determines that the yellow clearance timer has not expired, the system may continue to maintain the yellow clearance state at step 306. In certain embodiments, at step 308, if the system determines that the timer has expired, the system may proceed to step 310 where the system determines if the opposing roadway is still unsafe. According to various aspects of the present disclosure, the system may determine if the roadway is still unsafe via reading and processing readings from one or more sensors described herein, which may either detect objects nearby the device, or may receive signals over a wireless network sent by one or more devices associated with vehicles or pedestrians.

In one embodiment, if, at step 310, the system determines that the roadway is no longer in an unsafe condition, the system may reinstate the flashing yellow arrow state of step 302, which indicates to a driver that the roadway may be safely crossed (with caution). In certain embodiments, if, at step 310, the system determines that the roadway is still in an unsafe condition (based on sensor readings), the system may enter a minimum red state at step 312.

In particular embodiments, a minimum red state includes initiating a new state where a solid red arrow is illuminated. According to various aspects of the present disclosure, the solid red arrow may remain illuminated for a particular amount of time, according to a predetermined time threshold monitored by a minimum red timer. In one embodiment, the system may periodically check the minimum red timer at step 314, and if the minimum red timer is determined to not be expired at step 314, the system may remain in the minimum red state of step 312. In certain embodiments, if at step 314 it is determined that the minimum red timer is expired, the system may proceed to step 316, where the system enters a standard red state. In various embodiments, a standard red state includes maintaining a solid red arrow; however, the system may begin to analyze sensor readings for determining the safeness of the opposing roadway. In a particular embodiment, during the standard red state 316, the system may determine if the opposing roadway is safe to cross at step 318. If the system determines that the opposing roadway is not safe to cross at step 318, the system may continue to maintain the standard red state at step 316. However, in some embodiments, if the system determines, at step 318, that the opposing roadway is safe to cross, the system may reinstate the flashing yellow state at step 302. According to various aspects of the present disclosure, both the minimum red state and the standard red state may include maintaining a solid red arrow, a flashing red arrow, or any other appropriate color/pattern.

Exemplary Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system for traffic management, comprising:

a plurality of electronic computing devices at a plurality of automobiles, wherein each of the plurality of electronic computing devices includes one or more transmitters that propagate signals comprising location, speed, and heading data of a corresponding automobile of the plurality of automobiles; and a traffic management device located at a traffic crossing, wherein the traffic management device is positioned to monitor a respective opposing traffic lane, and wherein the traffic management device comprises:

one or more traffic data detection sensors, wherein the one or more traffic data detection sensors comprise radio frequency ("RF"), Wi-Fi, cellular, and radar sensors configured to detect traffic data comprising a distance and speed of automobiles approaching in an opposing traffic lane;

one or more traffic beacons; and a processor for controlling the one or more traffic beacons, wherein the processor is operatively connected to the one or more traffic data detection sensors and the processor is configured to:

receive the location, speed, and heading data from the plurality of electronic computing devices corresponding to approaching automobiles of the plurality of automobiles;

receive detected distance and speed traffic data corresponding to the approaching automobiles from the one or more traffic data detection sensors;

compare a first-received of the location, speed, and heading data or the detected distance and speed traffic data to a predetermined threshold for determining an expected time to arrival at the traffic crossing for the approaching automobiles;

determine a level of safeness for crossing the opposing traffic lane based on the expected time to arrival at the traffic crossing for the approaching automobiles; and indicate the level of safeness via the one or more traffic beacons to drivers and/or pedestrians intending to cross the opposing traffic lane.

2. The system of claim 1, wherein the plurality of electronic computing devices comprises mobile phones and/or on-board computing devices at the plurality of automobiles.

3. The system of claim 1, wherein the one or more traffic data detection sensors are configured to monitor about a thirty degree field of view, originating from the traffic management device, over a range of about 750-900 feet.

4. The system of claim 1, wherein the processor is further configured to compare the location, speed, and heading data to the detected distance and speed traffic data to confirm approaching automobiles.

5. The system of claim 1, wherein the traffic management device transmits the location, speed, and heading data, the detected distance and speed traffic data, and one or more expected times to arrival to neighboring traffic management devices.

6. The system of claim 1, wherein the system operates in near real-time.

7. The system of claim 1, wherein the one or more traffic beacons are configured to provide one or more visual indicators, each of the one or more visual indicators being indicative of a corresponding traffic state or a corresponding level of safeness.

8. The system of claim 7, wherein a yellow visual indicator of the one or more visual indicators indicates that the opposing traffic lane is safe to cross.

9. The system of claim 7, wherein a red visual indicator of the one or more visual indicators indicates that the opposing traffic lane is unsafe to cross.

10. The system of claim 9, wherein after a predetermined time threshold elapses without receiving new detected traffic data indicating a presence of an approaching automobile, the processor is further configured to change the red visual indicator to a yellow visual indicator.

11. The system of claim 10, wherein the predetermined time threshold is about ten seconds.

12. The system of claim 1, wherein the one or more traffic beacons exclude green visual indicators.

13. A system for traffic management, comprising:

a traffic management device located at a traffic crossing, wherein the traffic management device is positioned to monitor a respective opposing traffic lane, and wherein the traffic management device comprises:

one or more traffic data detection sensors, wherein the one or more traffic data detection sensors comprise one or more radar sensors configured to detect traffic data comprising a distance and speed of approaching automobiles that are approaching in an opposing traffic lane;

one or more traffic beacons; and a processor for controlling the one or more traffic beacons, wherein the processor is operatively connected to the one or more traffic data detection sensors and the processor is configured to:

receive location, speed, and heading (LSH) data from a plurality of electronic computing devices, wherein each electronic computing device of the plurality of electronic computing devices is associated with a corresponding automobile of a plurality of automobiles, and the LSH data indicates a location, speed, and heading corresponding to each of the plurality of automobiles;

receive, from the one or more traffic data detection sensors, detected distance and speed traffic data corresponding to each of the approaching automobiles;

compare a first-received of the LSH data or the detected distance and speed traffic data to a predetermined threshold for determining an expected time to arrival at the traffic crossing for the approaching automobiles;

determine a level of safeness for crossing the opposing traffic lane based on the expected time to arrival at the traffic crossing for the approaching automobiles; and indicate the level of safeness via the one or more traffic beacons to drivers and/or pedestrians intending to cross the opposing traffic lane.

14. The system of claim 13, wherein the plurality of electronic computing devices comprises a mobile phone or an on-board computing devices at one of the plurality of automobiles.

15. The system of claim 13, wherein the one or more traffic data detection sensors are configured to monitor a predetermined field of view originating from the traffic management device.

16. The system of claim 13, wherein the processor is further configured to compare the LSH data to the detected distance and speed traffic data to confirm the approaching automobiles.

17. The system of claim 13, wherein the traffic management device transmits, to neighboring traffic management devices, the LSH data, the detected distance and speed traffic data, or the expected time to arrival at the traffic crossing for the approaching automobiles.

18. The system of claim 13, wherein the one or more traffic beacons are configured to provide one or more visual indicators, each of the one or more visual indicators being indicative of a corresponding traffic state or a corresponding level of safeness.

19. The system of claim 18, wherein:

a yellow visual indicator of the one or more visual indicators indicates that the opposing traffic lane is safe to cross; or a red visual indicator of the one or more visual indicators indicates that the opposing traffic lane is unsafe to cross.

20. A system for traffic management, comprising:

a traffic management device located at a traffic crossing, wherein the traffic management device is positioned to monitor a respective traffic lane, and wherein the traffic management device comprises:

one or more traffic data detection sensors, wherein each of the one or more traffic data detection sensors is configured to detect traffic data corresponding to each of one or more approaching automobiles and transmit the traffic data as detected traffic data;

one or more traffic beacons; and a processor for controlling the one or more traffic beacons, wherein the processor is operatively connected to the one or more traffic data detection sensors and the processor is configured to:

for each of the one or more approaching automobiles:

receive transmitted vehicle data from one or more electronic computing devices associated with a corresponding approaching automobile of the one or more approaching automobiles;

receive the detected traffic data from at least one of the one or more traffic data detection sensors, wherein at least some of the detected traffic data corresponds to the corresponding approaching automobile; and compare a first-received of either the transmitted vehicle data or the detected traffic data to a predetermined threshold for determining an expected time to arrival at the traffic crossing for the one or more approaching automobiles;

determine a level of safeness for crossing the traffic crossing based on the expected time to arrival at the traffic crossing for the one or more approaching automobiles; and output instructions for the one or more traffic beacons to display one or more indications of the level of safeness.

* * * * *